(No Model.)
A. W. McCASLIN.
CLIP FOR BRAKE STAFFS, SHAFTS, &c.
No. 533,728.　　　　　　　　Patented Feb. 5, 1895.
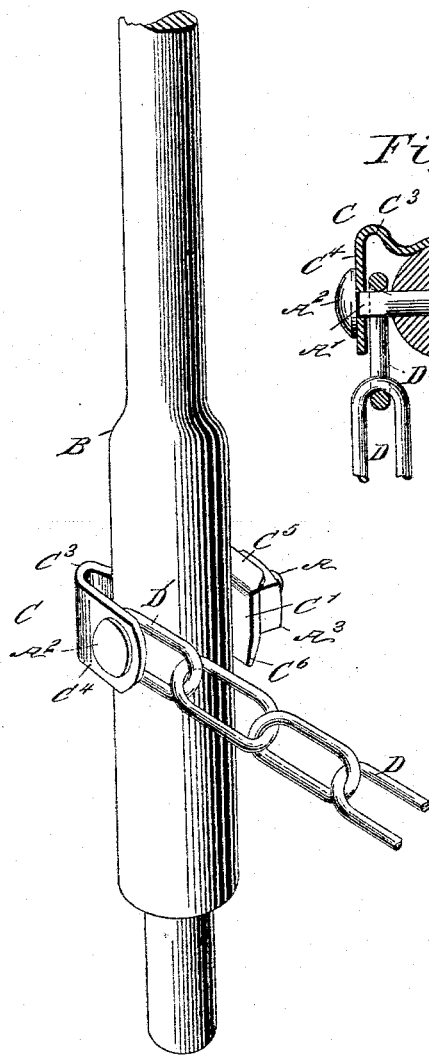
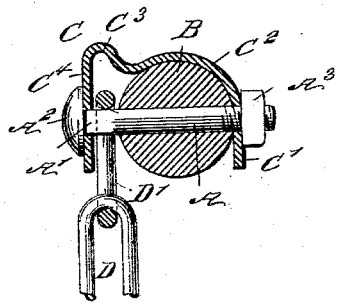
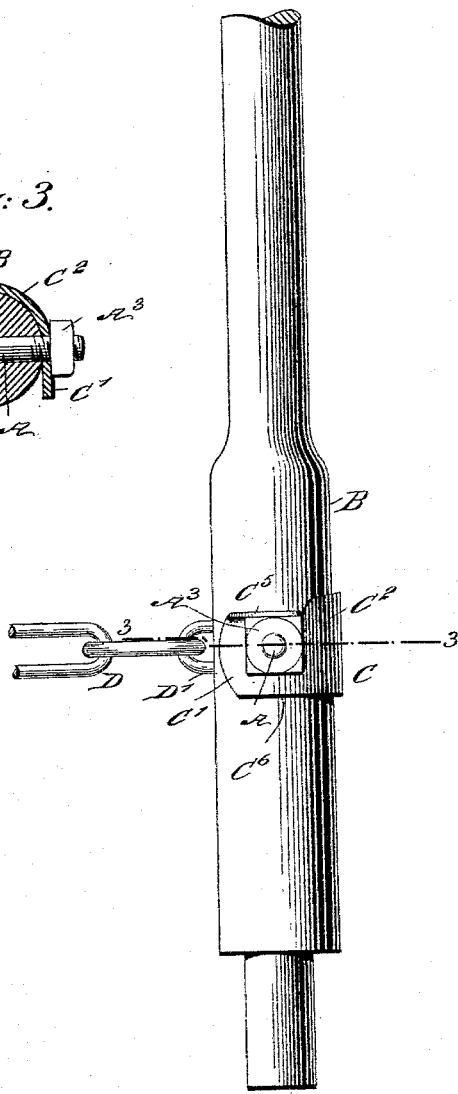
WITNESSES:
John A. Reynie
Theo. G. Hoster
INVENTOR
A. W. McCaslin
BY
Munn & Co.
ATTORNEYS.

UNITED STATES PATENT OFFICE.

ALBERT W. McCASLIN, OF PITTSBURG, PENNSYLVANIA, ASSIGNOR TO HIMSELF AND FREDERICK EMIL BRETCH, OF SAME PLACE.

CLIP FOR BRAKE-STAFFS, SHAFTS, &c.

SPECIFICATION forming part of Letters Patent No. 533,728, dated February 5, 1895.

Application filed October 31, 1894. Serial No. 527,575. (No model.)

*To all whom it may concern:*

Be it known that I, ALBERT W. MCCASLIN, of Pittsburg, in the county of Allegheny and State of Pennsylvania, have invented a new and Improved Clip for Brake-Staffs, Shafts, &c., of which the following is a full, clear, and exact description.

The object of the invention is to provide a new and improved clip designed to take the place of eye-bolts now used on brake-staffs, shafts and other devices for winding up a rope, cable or chain, the clip being very simple and durable in construction, easily applied, and not liable to break on a heavy or sudden strain.

The invention consists of a bolt, and a clip band held on the bolt and engaging part of the brake-staff or shaft to form a brace for the bolt.

The invention also consists in certain parts and details and combinations of the same, as will be hereinafter fully described, and then pointed out in the claim.

Reference is to be had to the accompanying drawings, forming a part of this specification, in which similar letters of reference indicate corresponding parts in all the views.

Figure 1 is a perspective view of the improvement as applied. Fig. 2 is a side elevation of the same; and Fig. 3 is a sectional plan view of the same, on the line 3—3 in Fig. 2.

The improved clip is provided with a bolt A, passed transversely through an aperture in the brake-staff B, shaft or other device on which the clip is to be used. The bolt A is preferably in the form of a carriage bolt, but other shapes of bolts may be employed. A clip band C, made of malleable iron, or steel, or a plate of sheet metal, is held on the bolt and engages part of the brake-staff B, to form the brace for the bolt, as illustrated in the drawings.

The straight end $C'$ of the clip band C engages the outer end of the bolt A under the nut $A^3$, and from this straight end extends the curved portion $C^2$, fitting on part of the peripheral surface of the brake-staff, to then be formed into a bend $C^3$, which terminates in the straight end $C^4$, engaged by the square end $A'$ of the bolt A under the fixed head $A^2$. The straight end $C^4$ as well as the bend $C^3$ extends away from the brake-staff B, so that sufficient space is left between the end $C^4$ and the side of the brake-staff for the passage of the connecting link $D'$ of the chain D, as plainly illustrated in Fig. 3.

It is understood that the aperture in the end $C^4$ for the square part $A'$ of the bolt A, is correspondingly made square, while the opening in the end $C'$ is made round for the passage of the threaded end of the said bolt.

Now it will be seen that the end $C'$ of the clip band is fastened to the brake-staff by screwing up the nut $A^3$ so that the curved bend $C^3$ as well as the end $C^4$, form a brace for the square end of the bolt A, so that the latter can withstand a very heavy and sudden strain transmitted by the chain D, cable, rope or other device used instead of the chain. The end $C'$ is preferably provided with a nut lock to prevent the nut $A^3$ from turning after the several parts are fastened in place, and this nut lock is formed by bending part of the end $C'$ over onto the side of the nut $A^3$, to prevent the latter from turning.

As shown in the drawings, the part $C^5$ is bent over on the top of the end $C'$ to engage the top side of the nut, and this part $C^5$ is preferably thinned at its edge to permit of conveniently bending it after the parts are in place and the nut is screwed up. Now when the clip is to be removed, this part $C^5$ is again bent upward in alignment with the end $C'$, to permit of unscrewing the nut $A^3$, but as this part cannot be well bent a second time to form a nut lock, I provide the end $C'$ with a second part $C^6$, which can be used as a nut lock after the parts are re-assembled and the nut $A^3$ is screwed up.

This device is applicable for fastening a chain to a car brake staff, or to a roller bar, a winding bar on drop bottom cars, or on shafting and other devices.

Having thus described my invention, I claim as new and desire to secure by Letters Patent—

The combination of a headed bolt adapted to be passed through a brake staff having a screw-threaded end, a nut thereon, and a clip having its opposite end correspondingly perforated to receive the said bolt, one end of said clip being straight and the other end being curved to embrace the brake shaft and having a projecting portion at one side of the perforation therein adapted to be bent up at right angles to form a lock for the nut on the bolt, substantially as set forth.

ALBERT W. McCASLIN.

Witnesses:
GEORGE MILLER,
JOSEPH E. HAWKINS.